Sept. 7, 1965  H. G. OLSON ETAL  3,204,848
COMPARTMENTED ARTICLE PACKAGING DEVICE
Filed Nov. 20, 1961  2 Sheets-Sheet 1

INVENTORS.
H. GLEN OLSON
C. DEAN OLSON
BY
Christie, Parker & Hale
ATTORNEYS.

Sept. 7, 1965   H. G. OLSON ETAL   3,204,848
COMPARTMENTED ARTICLE PACKAGING DEVICE
Filed Nov. 20, 1961   2 Sheets-Sheet 2
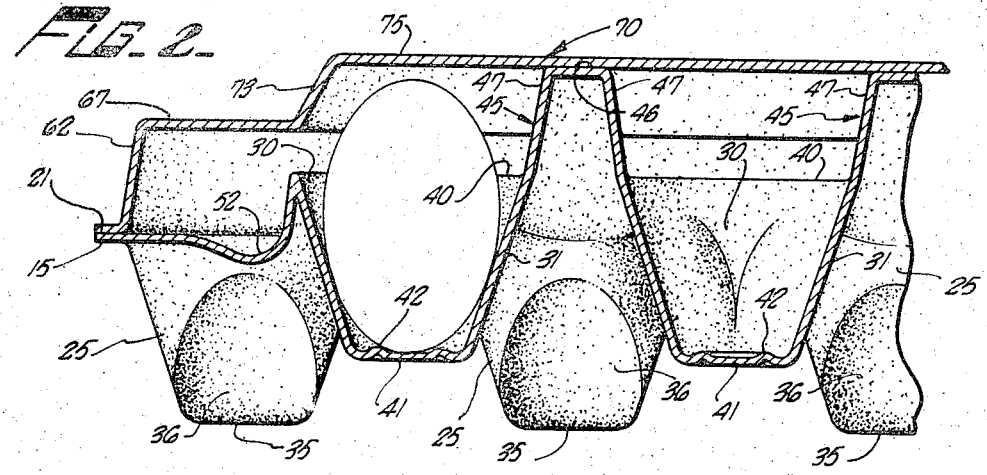
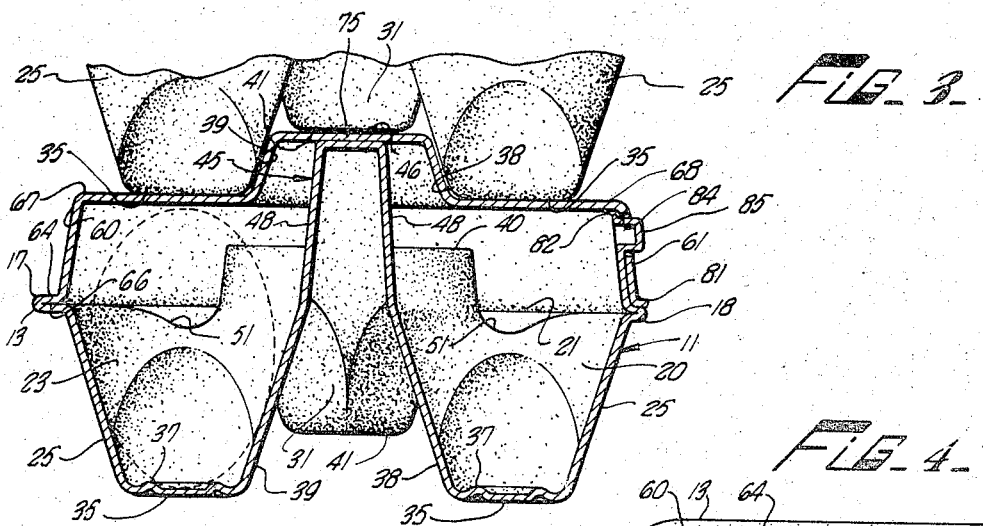
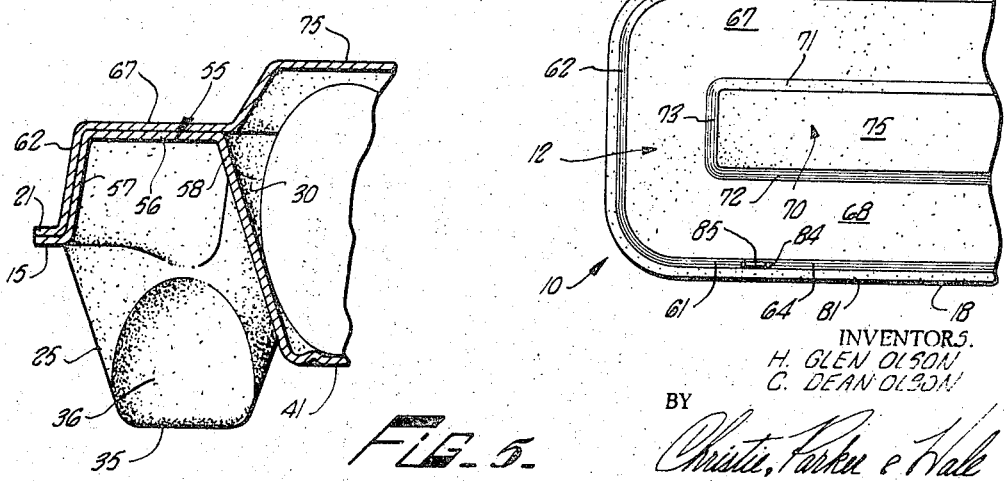
INVENTORS.
H. GLEN OLSON
C. DEAN OLSON
BY
Christie, Parker & Hale
ATTORNEYS.

United States Patent Office 3,204,848
Patented Sept. 7, 1965

3,204,848
COMPARTMENTED ARTICLE PACKAGING DEVICE
Heber Glen Olson, North Hollywood, and Clarence Dean Olson, Beverly Hills, Calif., assignors to Olson Brothers Inc., North Hollywood, Calif., a corporation of California
Filed Nov. 20, 1961, Ser. No. 153,427
9 Claims. (Cl. 229—2.5)

This invention relates to packaging apparatus. More particularly, it relates to improvements in egg cartons of the compartmented, individual egg receptacle type.

Conventional merchandising and packaging techniques, together with the normal size-oriented distribution pattern of eggs at the farm level have created problems in the wholesale egg packaging and merchandising industry. Young hens normally tend to lay more small eggs than large eggs. Also, extreme variations in weather patterns cause mature hens to lay small rather than large eggs. Accordingly, the supply of small eggs available to the wholesaler often is larger than normal and presents a distribution problem to the wholesaler. This imbalance in egg size distribution to the wholesaler is compounded by the buying habits of the public. It is conventional to market eggs in packages of one dozen each. Various sizes or grades of eggs are normally stocked by retail outlets in equal quantities. The general tendency of the purchasing public is to purchase the largest eggs available because of the impression that large eggs are inherently cheaper than small eggs. This creates a problem for both the retailer and wholesaler. The egg-size distribution characteristic of the consumer market is therefore considerably different from the egg-size distribution characteristic of the egg market in which the wholesale packer and merchandiser must obtain the eggs. The net result is that the wholesale egg merchandiser is left with a problem of disposing of the excess quantity of small eggs, which quantity he must purchase on the wholesale market in order to obtain the proper quantity of large eggs, but which quantity of small eggs is not consumed at the retail level.

There is a greater tendency for the purchasing public to buy the larger eggs at a higher cost than to purchase an equivalent number of small eggs at a lower cost per dozen. Economically, the cost per ounce of egg is substantially identical; so that if, say, fourteen small eggs were quantitatively equivalent to one dozen large eggs, fourteen small eggs could be displayed at the same cost as one dozen large eggs. The quantitative equivalent between large and small eggs is substantially as proposed—twelve large eggs equal fourteen small eggs. However, conventional marketing techniques as noted above defeat such quantitative equivalents between large and small eggs.

This invention provides a novel egg carton which alleviates the small egg surplus problem encountered by egg dealers at both the wholesale and retail levels. The invention provides a unique egg carton producible according to conventional methods. The carton provides individual receptacles for fourteen small eggs in a package having substantially the same length and width as the conventional one-dozen egg carton. The provision of a carton having the same, or substantially the same, plan area results in the carton of this invention being compatible with currently existing retail marketing facilities. The invention provides that fourteen small eggs, substantially equivalent in quantity and cost to one dozen large eggs, may be presented to the consumer at the same price as one dozen large eggs. Therefore the economic handicap associated with small eggs is removed and more small eggs are sold or cleared from the shelves of the retailer, thereby reducing and eliminating the troublesome surplus of small eggs at the wholesale level.

It should be noted that the feature of this invention providing increased egg storage capacity in a predetermined plan area is significant when it is realized that the invention is most useful with small eggs. Conventional large egg cartons will be retailed as is now the practice. It is therefore necessary that plan area compatibility exist between the new and the old carton.

In providing a novel and inventive egg carton overcoming the economic problems involved in the marketing of eggs, the invention further provides a carton having markedly improved structural characteristics. The carton of this invention has extremely high resistance to lateral and transverse bending forces tending to break open the carton. This carton protects the eggs contained therein and results in a carton providing improved stacking or display of the cartons in the retail marketing establishment.

Generally speaking, this invention provides a package comprising a lower shell and an upper shell. The lower shell defines a first plurality of spaced apart receptacles and a second corresponding plurality of spaced apart receptacles. The second plurality of receptacles is disposed in the lower shell to be spaced apart from, aligned with, and parallel to the first plurality of receptacles. Additionally, the lower package shell defines a third plurality of spaced apart receptacles disposed between and parallel to the first and second pluralities of receptacles. The first, second, and third pluralities of receptacles are alinged relative to one another such that individual receptacles of the third plurality are staggered with respect to aligned receptacles of the first and second pluralities. The package further comprises means for releasably engaging the upper shell in overlying closure relation to the lower shell.

The above mentioned and other features of this invention will be more completely presented in the following detailed explanation of this invention taken in conjunction with the accompanying drawings, wherein:

FIGURE 2 is a cross-sectional view of the carton as taken along line II—II of FIGURE 1;

FIGURE 3 is a cross-sectional view of the carton as taken along line III—III of FIGURE 1 illustrating the improved stacking or nesting characteristics of the carton;

FIGURE 4 is a top plan view of a closed carton; and

FIGURE 5 is a cross-sectional view of an alternate form of the lower portion of the carton as taken along line V—V of FIGURE 1.

Figure 1:
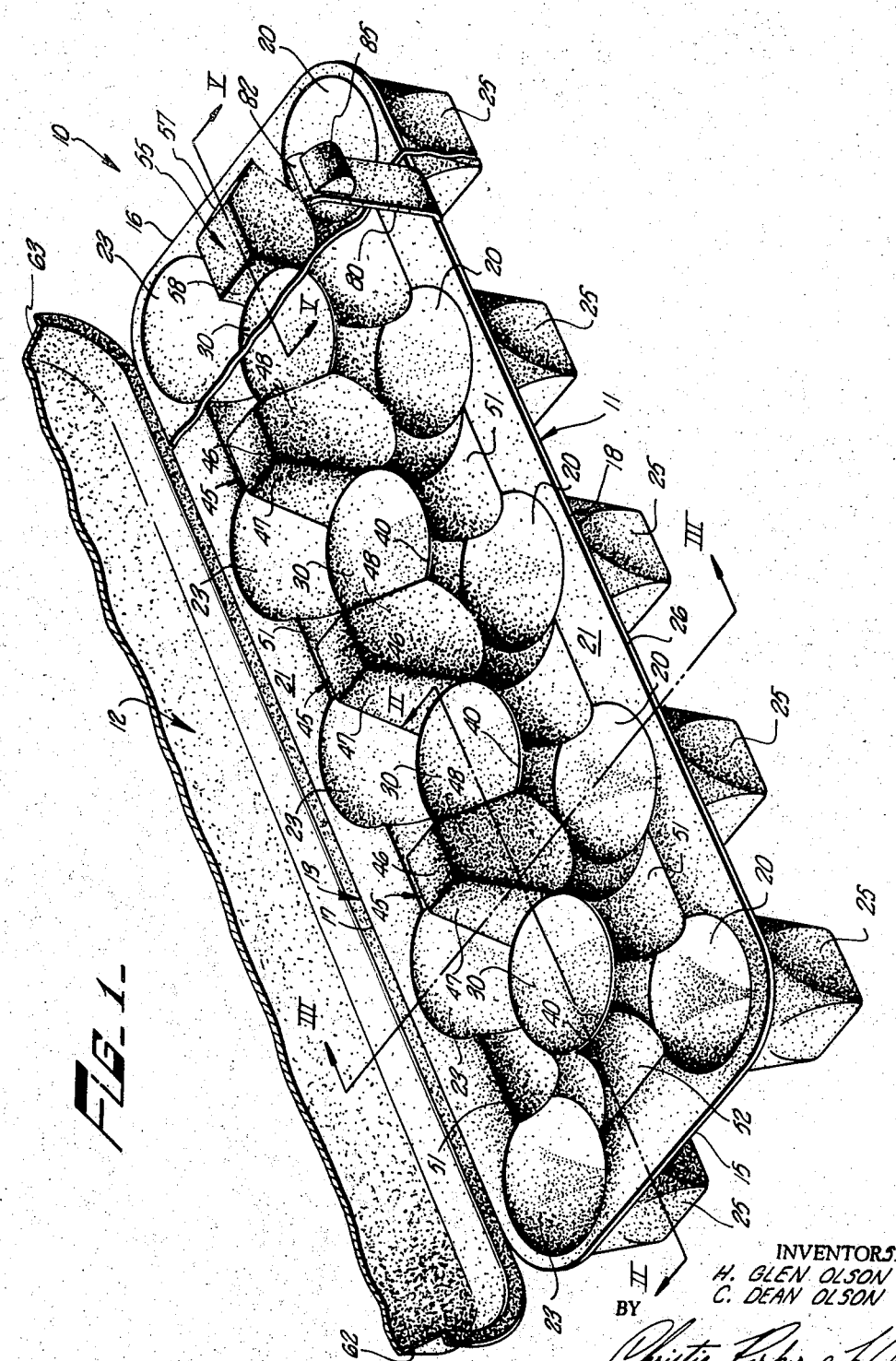
FIGURE 1 is a perspective view of the lower half of a carton according to this invention.

The conventional commercially available egg carton is a one-piece molded pulp product. The conventional carton provides an individual receptacle for each egg of one dozen eggs. It is normal to utilize a standard carton for all grades of eggs. However, in extreme cases, cartons of the general conventional configuration are specially provided in enlarged or reduced dimensions to accommodate the extremely large or extremely small egg.

The conventional and most economical method of fabricating egg cartons is by depositing a layer of pulp upon a form configured in accord with the shape of the desired product. Normally, a model or form of the desired carton configuration is fabricated from fine wire mesh or screen. The wire mesh mold or die for the carton is immersed in an aqueous suspension of fibrous pulp material. The suspension medium is caused to circulate in one direction through the wire mesh screen. During the course of this circulation the fibers constituting the pulp are deposited in a substantial thickness upon the wire form. The form is then withdrawn from the suspension and dried, after which time the mold is stripped and the finished product is trimmed into the end product,—an egg carton having receptacles for each individual egg. This form results in the fabrication of a unitary carton wherein the top portion of the carton is hinged integrally to the lower portion of the carton; the inherent flexibility and resiliency of the finished product is relied upon to provide the hinging function between the upper and lower portions of the unitarily formed carton.

The egg carton of this invention is compatible with conventional egg carton manufacturing techniques and methods. Re-entrant curves and blind corners resulting in a wire-mesh form which is impossible to strip from the molded article without damaging the finished product are avoided by the unique configuration of this invention.

A carton 10, illustrated in FIGURE 1, has a lower portion 11 and an upper portion 12. In a preferred form of the invention, the top portion or upper shell 12 and the lower portion or shell 11 are molded integrally with one another and are joined by a linear hinge or crimped portion 13 along one side of the carton. The lower shell portion 11 of carton 10 has end edges or limits 15 and 16 and longitudinal sides 17 and 18. The sides 17 and 18 are of greater extent than the ends 15 and 16.

A first plurality of cavities or receptacles 20, disposed in the lower shell 11 so as to be concave upwardly toward a top portion mating surface 21, are provided in the lower carton portion 11. These receptacles 20 are spaced apart uniformly from one another along a linear path. The carton lower shell 11 also includes a second plurality of concave upwardly receptacles 23 extending below the top portion mating surface 21. The receptacles 23 correspond in number to the receptacles 20 and are uniformly spaced apart from one another in a linear fashion. The spacing between receptacles 20 matches the spacing between receptacles 23. The receptacles 20 and 23 are defined by hollow truncated cone-like sockets or protrusions 25 extending downwardly from a planar element 26, the upper surface of which is defined by the upper shell mating surface 21.

As illustrated in FIGURE 1, the receptacles 20 and 23 are located at the intersections of a rectangular lattice or network. More specifically, two adjacent receptacles 20 are spaced apart from one another the same distance as two adjacent receptacles 23 of the second plurality. A line between the center of one of the receptacles 23 and the center of the adjacent receptacle 20 is perpendicular to a line joining the centers of the pair of receptacles 20. In the preferred form of this invention, there are five receptacles 20 and five receptacles 23 defining four rectangular sets of four receptacles, which sets are juxtaposed in end-to-end relation longitudinally of lower carton shell 11.

The lower shell 11 of carton 10 further includes a third plurality of receptacles 30. Receptacles 30 are uniformly spaced apart from one another along a linear path and are disposed between and parallel to the first and second pluralities of cavities 20 and 23, respectively. The spacing between adjacent ones of the cavities 30 may be, but is not necessarily limited to, the same spacing as exists between adjacent ones of the cavities 20 and 23. Furthermore, in a preferred form of this invention, the cavities or receptacles 30 are concave upwardly of the top shell mating surface 21. The receptacles 30 are disposed midway between the pluralities of cavities 20 and 23 so as to lie at the intersection of the diagonals of the rectangular network defined by the above described geometrical relationship existing between receptacles 20 and 23. Each of the third plurality receptacles 30 is defined by a downwardly projecting hollow truncated conical socket-like portion 31 (see FIGURES 2 and 3). In a preferred form of the invention there are four receptacles 30 in the third plurality of receptacles.

As illustrated most clearly in FIGURES 2 and 3, the depending sockets 25 defining cavities or receptacles 20 and 23 are of truncated conical configuration terminating in coplanar lower surfaces or bottoms 35. Adjacent the openings of the receptacles 20 and 23 to the top shell mating surface 21, the receptacles are substantially circular. Adjacent the bottoms 35 of the socket portions 25, the receptacles assume a substantially rectangular configuration as illustrated by the planar areas 36 of FIGURE 2. The bottom 35 of each of the sockets 25 is dimpled upwardly into a concave upwardly portion 37 adapted to receive the point of an egg in the receptacles 20 and 23 (see the dashed lines in FIGURE 3). Opposing exterior surfaces 38 and 39 of the sockets 25 of receptacles 20 and 23, respectively, converge upwardly and define the side walls of a carton stacking channel clearly illustrated in the upper portions of FIGURE 3.

The downwardly depending protrusions or sockets 31 defining the receptacles 30 are configured similar to the sockets 35 and project downwardly from coplanar upper rims 40 to coplanar lower surfaces 41. The truncated lower surfaces or bottoms 41 of sockets 31 are dimpled upwardly to form egg-point nesting portions 42 similar to the portions 37 of sockets 25.

As illustrated in FIGURES 2 and 3, the plane defining rim surfaces 40 of receptacles 30 is spaced above the top shell mating surface 21. The bottoms 41 of sockets 31 are similarly spaced above the plane defining the bottoms of sockets 25. Ideally, the distance between the planes of rims 40 and surface 21 is substantially identical to the distance between planes of socket bottoms 41 and socket bottoms 35. This distance is pre-selected relative to the diameters of the eggs which the carton 10 is intended to receive such that the distance between the sides 17 and 18 and between the ends 15 and 16 of the carton 10 correspond as nearly as possible to the similar dimensions of the conventional twelve-egg carton. In the preferred form of this invention, the dimensional equivalence between the fourteen-egg carton 10 of this invention and the twelve-egg carton conventionally utilized is so substantial that subdivided retail marketing and display facilities are capable of accepting both the conventional and the invention carton.

As mentioned above, the egg carton of this invention has particularly great utility when fabricated to receive small eggs so that the surplus of small eggs normally retained by the egg wholesaler may be distributed to the consuming public. The cartons of this invention will appear with conventional egg cartons in retail display facilities, which facilities are often subdivided for a standard sized egg carton. It is therefore very important that the plan dimensions of the invention carton 10 correspond to the plan dimensions of conventional cartons. This object is accomplished in this invention by advantageous use of the shape of an egg. An egg is an obloid, a geometrical solid of rotation that has a greater extent in one direction from the maximum diameter than the extent in an opposite direction. (It is noted, of course, that the invention carton 10 may be used advantageously with spheroids such as ball bearings.) The obloid configuration of eggs is utilized by staggering the third plurality of receptacles 30 both vertically and horizontally with respect to the first and second pluralities of receptacles 20 and 23. In this manner, by supporting the eggs on their small radius ends, an increased number of eggs may be received in the same area as was heretofore required to receive a reduced number of eggs.

A pedestal 45 is provided between adjacent ones of the cavities or receptacles 30 of the third plurality of receptacles. Each pedestal 45 extends upwardly from the plane of the rims 40 of receptacles 40 to a planar upper surface 46 parallel to the plane of rims 40. Each pedestal is configured in a truncated pyramidal form. The cross-section of the pyramid may be circular or oval, but in the preferred form of the invention illustrated in FIGURE 1, the cross-section of each pedestal 45 is rectangular. The distance between the top 46 of each pedestal 45 and the plane of the rims 40 of receptacles 30 corresponds to, and preferably is identical to, the distance between the bottoms 35 of receptacles 25 and the bottoms 41 of receptacles 31. The surfaces 47 of pedestals 45 disposed toward the ends 15 and 16 of the lower shell 11 are continuous with the adjacent portions of receptacles 30. The surfaces 48 of pedestals 45 disposed toward the longitudinal edges 17 and 18 of the lower shell 11 are continuous with the adjacent portions of the receptacles 20 and 23. The functions served by the pedestals 45 will be explained in greater detail below.

Each of the receptacles 20 and 23 is joined to its adjacent member of the first plurality of receptacles by a continuously curved surface portion 51. Each curved surface portion 51 extends initially downwardly from the top shell mating surface 21 and then recurves upwardly to the rim 40 of a receptacle 30 (see FIGURE 3). In a preferred form of the invention, a similar curved surface 52 joins the end pairs of receptacles 20 and 23 adjacent each of the ends 15 and 16 of the lower shell 11 (see FIGURE 2).

In an alternate form of the invention, however, a pedestal 55 (see FIGURES 1 and 5) may replace the curved surfaces 52 adjacent the ends 15 and 16 of the lower shell. Each pedestal 55 has an upper surface 56, an end surface 57 disposed adjacent the end 15 or 16, and an opposite end surface 58 continuous with the receptacle 30 adjacent which the pedestal 55 is located. Where the pedestals 55 are provided, the distance between the upper surface 56 of pedestal 55 and the bottom 35 of the adjacent ones of the receptacles 20 and 23 corresponds to the distance between the bottoms 41 of receptacles 30 and the top surfaces 46 of pedestals 45. The reason for these dimensional correlations will be explained in more detail below.

It will be noted from an examination of the cross-sectional drawings of FIGURES 2 and 3 that the lower shell 11, when viewed from either the top or from the bottom, does not present hidden surfaces resulting from re-entrant curves. This configuration of the lower shell 11 means that the conventional fibrous pulp depositation manufacturing process is feasible and is advisable in the production of such a carton 10.

As mentioned before, the top shell or lid of the carton 10 is hinged by the rib 13 along the side 17 of the bottom 11. The top provides a concave member which, when secured over the lower member 11, securely retains the eggs in receptacles 20, 23, and 30. As presented in FIGURE 3, the top 12 has a longitudinal side surface 60 adjacent the hinge 13 and an opposite front side surface 61. The side surfaces 60 and 61 converge as they extend upwardly away from the lower shell 11 when the lid 12 is in closure relation to the bottom 11. A similar end surface 62 (see FIGURE 2) is provided adjacent end 15 of the bottom 11 and extends upwardly at the same inclination to the vertical as do the side surfaces 60 and 61. A similar end surface 63 is adjacent lower portion end 16 (FIGURE 1). A peripheral flange 64 extends around the entire lid 12 and defines a bottom shell mating surface 66 engageable with the upper shell mating surface 21. The sides 60 and 61 and the ends 62 and 63 extend to a coplanar pair of lid portions 67 and 68 disposed parallel to the plane of the bottom shell mating surface 66.

A longitudinal raised rib portion 70 is provided in the carton top 12 to define a concave downwardly recess opening toward the plane of lid portions 67 and 68. The longitudinal dimple or rib 70 is defined by converging side surfaces 71 and 72 and by converging end surfaces 73 extending from the lid coplanar portions 67 and 68 to a planar surface 75 disposed above and parallel to the coplanar surfaces 67 and 68. The longitudinal extent of the raised rib or dimple 70 is substantially over only the middle plurality of receptacles 30; i.e., the raised dimple portion 70 does not extend completely between the converging end surfaces 62 and 63 of the lid 12.

When the lid 12 is in closure relation to the carton bottom 11, as illustrated in FIGURES 2 and 3, the under surface of the rib top 75 engages the upper surface 46 of the central pedestals 45. Such engagement provides that forces imposed upon the upper portions of the carton 10 do not deflect the carton 10 downwardly to crush and damage eggs contained within receptacles 20, 23, and 30. Instead, the pedestals 45, by virtue of their downwardly diverging legs extending to the bottoms 35 of sockets 25, transfer such loads to the base upon which the carton 10 is disposed.

The distance between the underside of the rib top 75 and the bottom 41 of sockets 31 preferably corresponds to the distance between the undersides of coplanar surfaces 67 and 68 and the bottoms 35 of sockets 25. In other words, the top 75 of the longitudinal rib 70 is disposed above the coplanar top surfaces 67 and 68 substantially the same distance as the bottoms 41 of sockets 31 are disposed above the bottoms 35 of the sockets 25. As illustrated in FIGURE 3, however, the distance defined above relative to the longitudinal rib 70 is slightly less than the displacement of the sockets 31 relative to sockets 25. This assures that proper mating of stacked cartons is possible. In conjunction with this mating feature, the distances between the converging sides 71 and 72 of the longitudinal rib 70 are slightly less than the spacing between the opposed converging sides 38 and 39 of the sockets 25. Such similarity of configuration between the bottom 11 and top 12 of the carton permits stacking of a plurality of cartons, as illustrated in FIGURE 3, in a highly stable manner. The presence of the longitudinal rib 70 engaged between the sockets 25 of receptacles 20 and 23 serves to interlock the stacked cartons.

When the top 12 is in closure relation to the carton bottom 11, the distances between rib top 75 and receptacle bottoms 41, and between top portions 67 and 68 and receptacle bottoms 31, is preselected to be slightly greater than the maximum dimension of the eggs received in receptacles 20, 23, and 30. This dimensional property assures that the eggs are supported only from the bottom. Therefore a load imposed upon the top 12 of carton 10 will not induce stresses and damage in the eggs contained in the carton. Additionally, this dimensional property assures that eggs will not become so disengaged from their respective receptacles as to jar against each other when the carton is inverted or placed on one of its ends.

If the pedestals 55, described previously, are provided on the carton bottom 11 in lieu of or in conjunction with the pedestals 45, additional structural stabilizing features of the closed carton are present. As illustrated in FIGURE 5, the underside of lid surface 67 adjacent the ends 62 and 63 of lid 12 engage the upper surfaces 56 of pedestals 55 when the carton is closed. Such engagement further provides for structural integrity of the closed carton 10 and improves the protection afforded eggs disposed in receptacles 20, 23, and 30.

As illustrated best by FIGURES 1 and 3, a pair of tabs 80 are hinged to the bottom shell 11 along longitudinal edge 18. This hinging is by means of beaded portions 81 similar to the rib or beaded portion 13 hinging top 12 to bottom shell 11. The flap 80 has a lateral dimension from the rib portion 81 to its free end or extremity 82 less than the distance between the peripheral flange 64 and the adjacent top surface 68 of top 12. The inclined longitudinal surface of top 12 adjacent the surface 68 defines a pair of spaced-apart apertures 84 aligned with tabs 80. A dimple or lug projection 85 is molded into the tab 80 in such relation to the aperture 84 that when the top 12 is hingedly engaged with the bottom 11 in closure relation thereto, the lugs 85 project through the apertures 84 in top side surface 61. The inherent resiliency present in the hinge beaded portion 81 maintains such connection between the lugs 85 and apertures 84 such that top 12 is maintained in overlying closure relation with the bottom shell 11. A continuous flap incorporating the lugs 84 preferably is provided. The tabs 80 are shown in FIGURE 1 for illustrative convenience so as not to obscure the major portion of FIGURE 1.

The structural integrity of the carton 10 provided by this invention is further improved over those cartons known heretofore since, by virtue of the staggering of receptacles 30 with respect to receptacles 20 and 23 and the elevation of the sockets 31 above the sockets 25, there are no transverse or longitudinal planes about which bending may occur. The interposition of receptacles 30 with sockets 31 destroys the longitudinal and transverse bending tendency provided in the normal egg carton. Because of the improved structural characteristics of the carton provided by this invention, it is possible to manufacture the carton using a lesser thickness of pulp depositation layer than in previously known cartons. The result is that cartons may be manufactured more cheaply and more rapidly to accomplish the same functions more effectively.

In the foregoing description, the invention has been presented in conjunction with a carton adapted for the receipt and storage of fourteen eggs. It is within the scope of this invention, however, that the configuration of receptacles 20, 23, and 30 described above may be extended longitudinally and transversely into any desired size for the packaging of any desired number of articles.

It is within the scope of this invention that the configuration of the bottom shell 11 presented above may be modified for horizontal dividers in bulk egg packaging techniques. In such cases, the pedestals 45 may be removed and the spaces between receptacles 30 be covered by a set of coplanar horizontal surfaces. The pattern of sockets in one divider may be offset with respect to the receptacle patterns in adjacent dividers. The bottoms of sockets 25 in the next above divider will rest upon these surfaces between receptacles 30.

From the foregoing description it should also be apparent that this invention provides an egg-packaging carton for marketing small eggs in a manner to reduce the surplus of small eggs left in the wholesaler's hands when current marketing and purchasing patterns are compared with the normal production pattern of egg size. Such a carton as described above has a planar area substantially identical to the conventional twelve-egg carton such that the carton of this invention is fully useful in retail merchandising facilities wherein the shelves are often subdivided into bins designed to accommodate the conventional twelve-egg carton.

While the invention has been described above in conjunction with a specific configuration of receptacles and divisions between receptacles, generally this has been by way of example and is not to be considered as a limitation to the scope of this invention.

We claim:

1. An egg package comprising a lower shell and an upper shell, the shells being portions of an integral member, the lower shell being a unitary molded member having a first plurality of receptacles uniformly spaced apart along a straight path, a corresponding second plurality of receptacles formed in the lower shell uniformly spaced apart along a straight path, the second plurality being disposed to be spaced apart from and horizontally and vertically aligned with the first plurality, and a third plurality of uniformly spaced apart receptacles defined by the lower shell in fixed relation to one another and to the receptacles of the first and second pluralities and arranged along a straight path disposed between and parallel to the first and second pluralities, the receptacles of the third plurality being uniformly elevated above the first and second pluralities in staggered alignment therewith, and means for releasably engaging the upper shell in overlying closure relation to the lower shell, the receptacles of the first, second, and third pluralities being exposed when the upper shell is disengaged from closure relation to the lower shell.

2. A retail egg merchandising package comprising a lower shell and an upper shell, the shells being portions of an integral member fabricated from deposited fibrous pulp, the lower shell being a unitary molded member defining a first plurality of five receptacles uniformly spaced apart along a straight path, a second plurality of five receptacles in the lower shell uniformly spaced apart along a straight path, the second plurality being disposed to be spaced apart from and horizontally and vertically aligned with the first plurality, and a third plurality of four spaced apart receptacles defined by the lower shell in fixed relation to one another and to the receptacles of the first and second pluralities and elevated above and disposed between and parallel to the first and second pluralities in staggered relation with respect to aligned receptacles of the first and second pluralities, and portions of the integral member for releasably engaging the upper shell in overlying closure relation to the lower shell, all the receptacles being exposed when the upper shell is disengaged from closure relation to the lower shell.

3. A package comprising an upper shell portion, a unitary molded member defining a lower shell portion, a portion between the shell portions adapted for hinging the shell portions together, and means for releasably engaging the upper shell portion in overlying closure relation to the lower shell portion, the lower shell defining a first plurality of spaced apart receptacles and a second plurality of spaced apart receptacles disposed parallel to the first plurality, receptacles of the second plurality being spaced apart from and aligned with corresponding receptacles of the first plurality, the lower shell defining a third plurality of spaced apart receptacles disposed in fixed staggered relation to the first and second pluralities of receptacles, the third plurality of receptacles being raised from and disposed between the first and second pluralities of receptacles, the lower shell further defining an upwardly extending pedestal between adjacent ones of the third plurality of receptacles, the pedestals having coplanar upper end surfaces, the upper shell engaging the pedestal end surfaces when the upper shell is engaged with the lower shell in overlying closure relation thereto, all the receptacles being exposed to receive articles therein when the upper shell is disengaged from closure relation to the lower shell.

4. A molded package comprising an upper shell portion, a lower shell portion, a portion between the shell portions adapted for hinging the shell portions together, and means for releasably engaging the upper shell portion in overlying closure relation to the lower shell portion, the lower shell defining a first plurality of spaced apart concave upwardly receptacles, a second plurality of spaced apart concave upwardly receptacles disposed parallel to the first plurality, receptacles of the second plurality being spaced apart from and aligned with corresponding receptacles of the first plurality, the lower shell having a plurality of downwardly depending hollow protrusions having coplanar ends, the hollow portions of the protrusions defining the first and second pluralities of receptacles, the lower shell having a second plurality of downwardly depending hollow protrusions having coplanar ends disposed in staggered relation to the first plurality of protrusions, the hollow portions of the second plurality of protrusions defining a third plurality of receptacles, the ends of the second plurality of protrusions being disposed above and parallel to the plane of the ends of the first plurality of protrusions whereby the third plurality of receptacles is raised from the first and second pluralities of receptacles, the lower shell further defining an upwardly extending pedestal between adjacent ones of the third plurality of receptacles, the pedestals having coplanar end surfaces disposed parallel to the planes of the protrusion bottoms, the upper shell engaging the pedestal end surfaces when the upper shell is engaged with the lower shell in overlying closure relation thereto.

5. A one piece molded package adapted for retail merchandising of eggs comprising an upper shell portion, a lower shell portion, a portion between the shell portions adapted for hinging the shell portions together, and means for releasably engaging the upper shell portion in overlying closure relation to the lower shell portion, the lower shell defining a first plurality of spaced apart concave upwardly egg receptacles, a second plurality of spaced apart concave upwardly egg receptacles disposed parallel to the first plurality, receptacles of the second plurality being spaced apart from and aligned with corresponding receptacles of the first plurality, the lower shell having a plurality of downwardly depending hollow protrusions having coplanar ends, the hollow portions of the protrusions defining the first and second pluralities of receptacles, the lower shell having a second plurality of downwardly depending hollow protrusions having coplanar ends disposed in staggered relation to the first plurality of protrusions, the hollow portions of the second plurality of protrusions defining a third plurality of receptacles, the ends of the second plurality of protrusions being disposed above and parallel to the plane of the ends of the first plurality of protrusions whereby the third plurality of receptacles is raised from the first and second pluralities of receptacles, the lower shell further defining an upwardly extending pedestal between adjacent ones of the third plurality of receptacles, the pedestals having coplanar upper end surfaces disposed parallel to the planes of the protrusion bottoms, the upper shell having a pair of coplanar surface portions, side walls peripherally of the coplanar surfaces extending to means engageable with the lower shell, and a raised rib portion having a top surface disposed parallel to the coplanar surface portions, the rib defining a cavity opening concave downwardly when the upper shell is engaged with the lower shell, the rib top surface being spaced from the coplanar surface portions a distance substantially equal to the distance between the bottoms of the first and second pluralities of protrusions, the top surface of the rib portion interiorly of the cavity engaging the pedestal end surfaces when the upper shell is engaged with the lower shell in overlying closure relation thereto.

6. A one piece molded package adapted for retail merchandising of eggs comprising an upper shell portion, a lower shell portion, a portion between the shell portions adapted for hinging the shell portions together, and means for releasably engaging the upper shell portion in overlying closure relation to the lower shell portion, the lower shell defining a first plurality of spaced apart concave upwardly egg receptacles, a second plurality of spaced apart concave upwardly egg receptacles disposed parallel to the first plurality, receptacles of the second plurality being spaced apart from and aligned with corresponding receptacles of the first plurality, the lower shell having a plurality of downwardly depending hollow protrusions having coplanar ends, the hollow portions of the protrusions defining the first and second pluralities of receptacles, the protrusions defining spaced apart opposing converging surfaces, the lower shell also having a second plurality of downwardly depending hollow protrusions having coplanar ends disposed in staggered relation to the first plurality of protrusions, the hollow portions of the second plurality of protrusions defining a third plurality of receptacles, the ends of the second plurality of protrusions being disposed above and parallel to the plane of the ends of the first plurality of protrusions whereby the third plurality of receptacles is raised from the first and second pluralities of receptacles, the lower shell further defining an upwardly extending pedestal between adjacent ones of the third plurality of receptacles, the pedestals having coplanar upper end surfaces disposed parallel to the planes of the protrusion bottoms, the upper shell having a pair of coplanar surface portions, side walls peripherally of the coplanar surfaces extending to means engageable with the lower shell, and a raised rib portion having a top surface disposed parallel to the coplanar surface portions, converging opposite side surfaces of the rib engageable with the converging surfaces of the first plurality of protrusions of a similar package when the package forms a part of a stack of such packages, the rib defining cavity opening concave downwardly when the upper shell is engaged with the lower shell, the rib top surface being spaced from the coplanar surface portions a distance substantially equal to the distance between the bottoms of the first and second pluralities of protrusions, the top surface of the rib portion interiorly of the cavity engaging the pedestal end surfaces when the upper shell is engaged with the lower shell in overlying closure relations thereto.

7. A one piece molded package having spaced apart ends adapted for retail merchandising of eggs comprising an upper shell portion, a lower shell portion, a portion between the shell portions adapted for hinging the shell portions together, and means for releasably engaging the upper shell portion in overlying closure relation to the lower shell portion, the lower shell defining a first plurality of spaced apart concave upwardly egg receptacles, a second plurality of spaced apart concave upwardly egg receptacles disposed parallel to the first plurality, receptacles of the second plurality being spaced apart from and aligned with corresponding receptacles of the first plurality, the lower shell having a plurality of downwardly depending hollow protrusions having coplanar ends, the hollow portions of the protrusions defining the first and second pluralities of receptacles, the lower shell having a second plurality of downwardly depending hollow protrusions having coplanar ends disposed in staggered relations to the first plurality of protrusions, the hollow portions of the second plurality of protrusions defining a third plurality of receptacles, the ends of the second plurality of protrusions being disposed above and parallel to the plane of the ends of the first plurality of protrusions whereby the third plurality of receptacles is raised from the first and second pluralities of receptacles, the lower shell further defining a pair of upwardly extending pedestals between adjacent end ones of the first and second pluralities of receptacles adjacent the spaced apart ends of the package, the pedestals having coplanar upper end surfaces disposed parallel to the planes of the protrusion bottoms, the upper shell defining a planar surface portion having side walls peripherally thereof extending to means engageable with the lower shell, and a raised rib portion having a top surface disposed parallel to the planar surface portion, the rib defining a cavity opening concave downwardly when the upper shell is engaged with the lower shell and overlying the third plurality of receptacles, the rib top surface being spaced from the coplanar surface portions a distance substantially equal to the distance between the bottoms of the first and second pluralities of protrusions, the upper shell planar surface portion engaging the pedestal end surfaces when the upper shell is engaged with the lower shell in overlying closure relation thereto.

8. An egg package comprising a lower and an upper shell, the shells being portions of an integral member, the lower shell having a first plurality of receptacles spaced apart along a straight path, a corresponding second plurality of receptacles formed in the lower shell and spaced apart along a straight path, the second plurality being disposed to be spaced apart from, aligned with and parallel to the first plurality, a third plurality of receptacles formed in the lower shell spaced apart along a straight path and disposed between and parallel to the first and second pluralities, individual receptacles of the third plurality being elevated above and staggered with respect to aligned receptacles of the first and second pluralities, the receptacles of the first and second pluralities having opposing spaced apart converging exterior surfaces, and a raised rib formed in the upper shell aligned over the third plurality of receptacles when the upper shell is engaged in closure relation with the lower shell, the rib being engageable with the opposing converging surfaces of a similar package when the package forms a part of a stack of such packages.

9. An egg package comprising an elongated substantially rigid lower shell and an upper shell integrally hingedly connected to the lower shell along the elongate extent of one side thereof, the lower shell being a unitary molded member defining first, second and third pluralities of upwardly opening uniformly spaced apart and linearly arranged receptacles fixed relative to one another, the first and second pluralities having equal numbers of receptacles and being aligned with each other along the elongate extent of the lower shell, the receptacles of the third plurality being disposed between and staggered with respect to the first and second pluralities, the lower shell between each adjacent pair of receptacles of the third plurality defining a pedestal having its upper end disposed above the periphery of the lower shell, and means for releasably engaging the upper shell in overlying closure relation to the lower shell, the upper end of each pedestal engaging the upper shell when the upper shell is disposed in closure relation to the lower shell, all the receptacles being exposed when the upper shell is disengaged from closure relation to the lower shell.

References Cited by the Examiner

UNITED STATES PATENTS

| | | |
|---|---|---|
| 1,000,694 | 8/11 | Schaeffer et al. |
| 1,173,114 | 2/16 | Lane. |
| 2,756,918 | 7/56 | Schwartzberg _____ 229—29 X |
| 2,834,233 | 4/60 | Schwartzberg _____ 229—2.5 X |

FOREIGN PATENTS

| | | |
|---|---|---|
| 815,204 | 6/59 | Great Britain. |

GEORGE O. RALSTON, *Primary Examiner.*

EARLE J. DRUMMOND, *Examiner.*